United States Patent [19]

Taylor

[11] 3,841,553
[45] Oct. 15, 1974

[54] VACUUM CLEANING UNIT FOR VEHICLES
[75] Inventor: Alexander R. Taylor, N. Burnaby, British Columbia, Canada
[73] Assignee: The Raymond Lee Organization, Inc., New York, N.Y. ; a part interest
[22] Filed: Apr. 2, 1973
[21] Appl. No.: 347,138

[52] U.S. Cl.............. 237/12.3 R, 237/1 R, 15/313
[51] Int. Cl............................................... B60h 1/02
[58] Field of Search.......... 237/1 R, 12.3 B, 12.3 A, 237/12.3 R; 98/2.08, 2.11; 15/313

[56] References Cited
UNITED STATES PATENTS
1,777,514  10/1930  Burgin et al. ...................... 237/1 R
2,218,265  10/1940  Norwood ....................... 237/12.3 R
2,277,568  3/1942   Tavernese .............................. 237/1

Primary Examiner—William E. Wayner
Attorney, Agent, or Firm—Howard I. Podell

[57] ABSTRACT

A combination air circulating and vacuum cleaning system for vehicles in which the intake of the conventional heater circulator system may be connected by valves alternately to either a fresh air intake, to an intake leading from the heater, or to an intake duct connected to a vacuum cleaning attachment duct. The proposed apparatus serves the conventional functions of an air heater and air circulator of a vehicle and provides the additional function of serving as a vacuum cleaner when it is desired to clean the vehicle.

2 Claims, 2 Drawing Figures

VACUUM CLEANING UNIT FOR VEHICLES

SUMMARY OF THE INVENTION

This invention relates to an apparatus which serves the combined functions of circulating air and heated air through a vehicle and of providing a source of suction for a vacuum cleaning attachment.

The advantage of this invention is that the incorporation of vacuum cleaning means to a conventional air circulating system in the automobile permits the operator to clean the vehicle when desired, without requirement of utilization externally powered equipment.

The device consists of an attachment to the intake of a conventional automobile heating and circulating system, whereby valves may close the conventional fresh air intake and heater intake leading to such systems and draw in air through an attached dust collecting bag and a vacuum hose unit.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
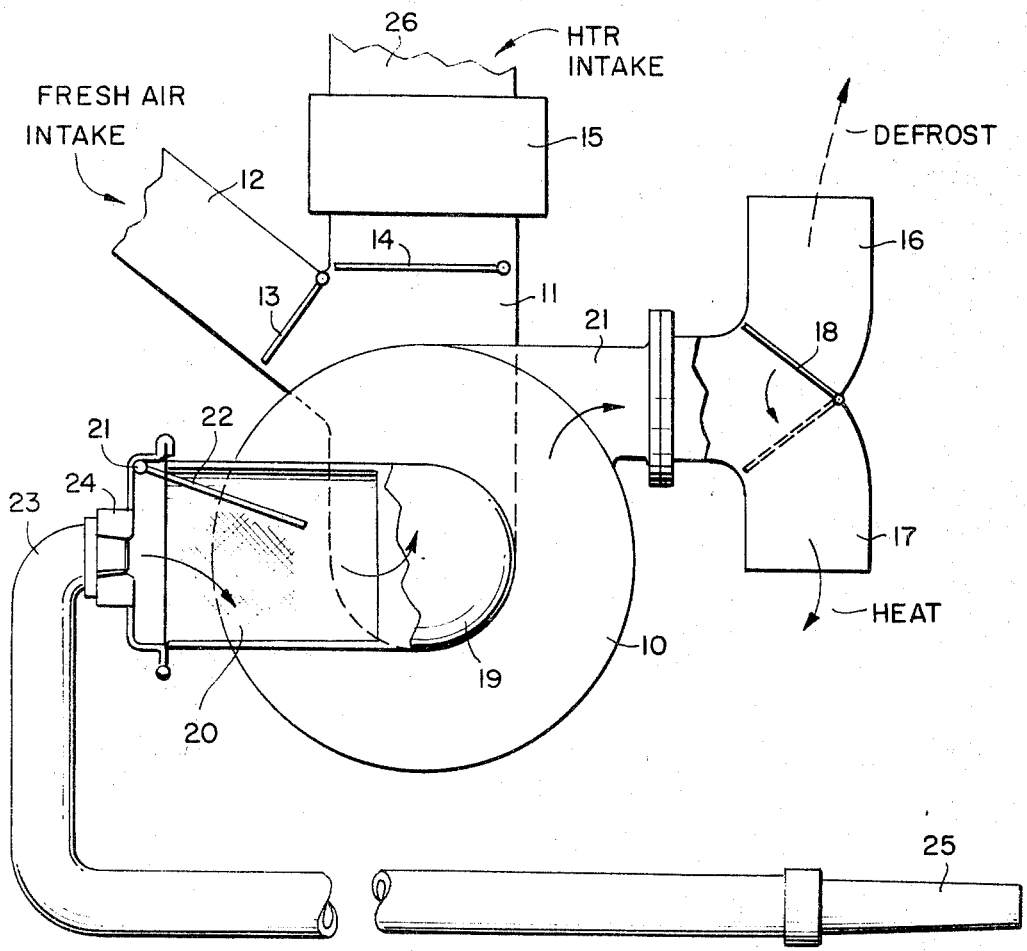
FIG. 1 is a schematic diagram in elevation view of the proposed apparatus.
Figure 2:
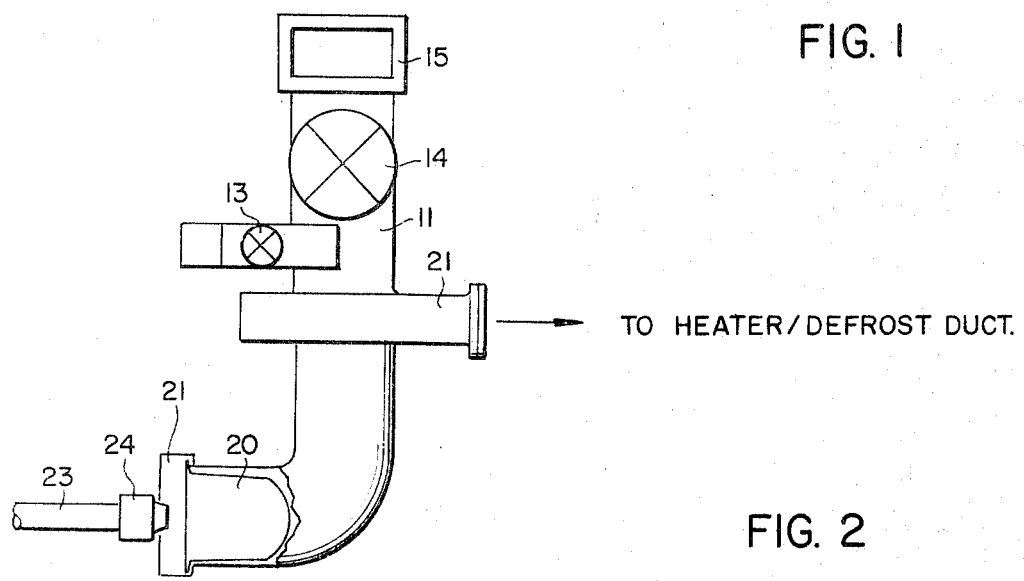
FIG. 2 is a schematic diagram in plan view of the apparatus.

Turning now descriptively to the drawings, in which similar reference characters denote similar elements throughout the several views, FIG. 1–2 illustrate the air heating and cleaning system of a vehicle which utilizes the blower 10 to draw air in through the blower intake 11 and exhausts the air through the blower exhaust 21 to either the defroster outlet 16 or the heater outlet 17 depending upon the setting of valve 18 in the exhaust pipe. For normal heating use, the blower 10 draws in air through the intake 11 from either the fresh air intake 12, or the heater intake 26 through heater 15, depending upon the setting of duct valves 13 in the fresh air intake duct 12, and valve 14 in the heater intake duct 26.

The cleaning system is connected to an auxiliary intake duct 19, in which a cleaning bag 20 is mounted, so as to catch dust and debris drawn in through the cleaning system. A removable cap 21 permits removal of the cleaning bag 20. The air intake is drawn by the blower 10 through the cleaning bag 20 when duct valve 22 is in the open position. A hose coupler 24 is mounted on the cap 21 to permit the attachment of a flexible cleaning tube 23, the free end of which is capped with a collection nozzle 25.

Depending upon the setting of duct valves 13, 14 and 22, air may be drawn in by the blower 10 through either the cleaning system, through the fresh air intake or through the heater intake, and expelled, depending upon the setting of duct valve 18, through either the defrost outlet 16 or the heater outlet 17.

This invention provides for a permanent vacuum cleaning apparatus in a vehicle with very little increase in cost or in space requirements.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A combined air heating and air cleaning apparatus for use in vehicles, comprising a blower for drawing air in through either a fresh air intake, a heater intake, or a suction cleaning apparatus intake, said blower expelling the air through either a defrost outlet or a heater outlet in the vehicle, with a dust collection bag mounted in the cleaning intake line together with means to attach a cleaning hose to the cleaning intake line.

2. The combination as recited in claim 1, in which a valve may be set in the duct of the cleaning intake line so as to either permit passage of intake air through the cleaning line or to prevent passage of intake air through the cleaning intake line when the blower is on.

\* \* \* \* \*